Feb. 1, 1927.
V. P. WILLIAMS
1,615,860
ADJUSTABLE VEHICLE SUPPORTING AND TURNING DEVICE
Filed Dec. 9, 1925
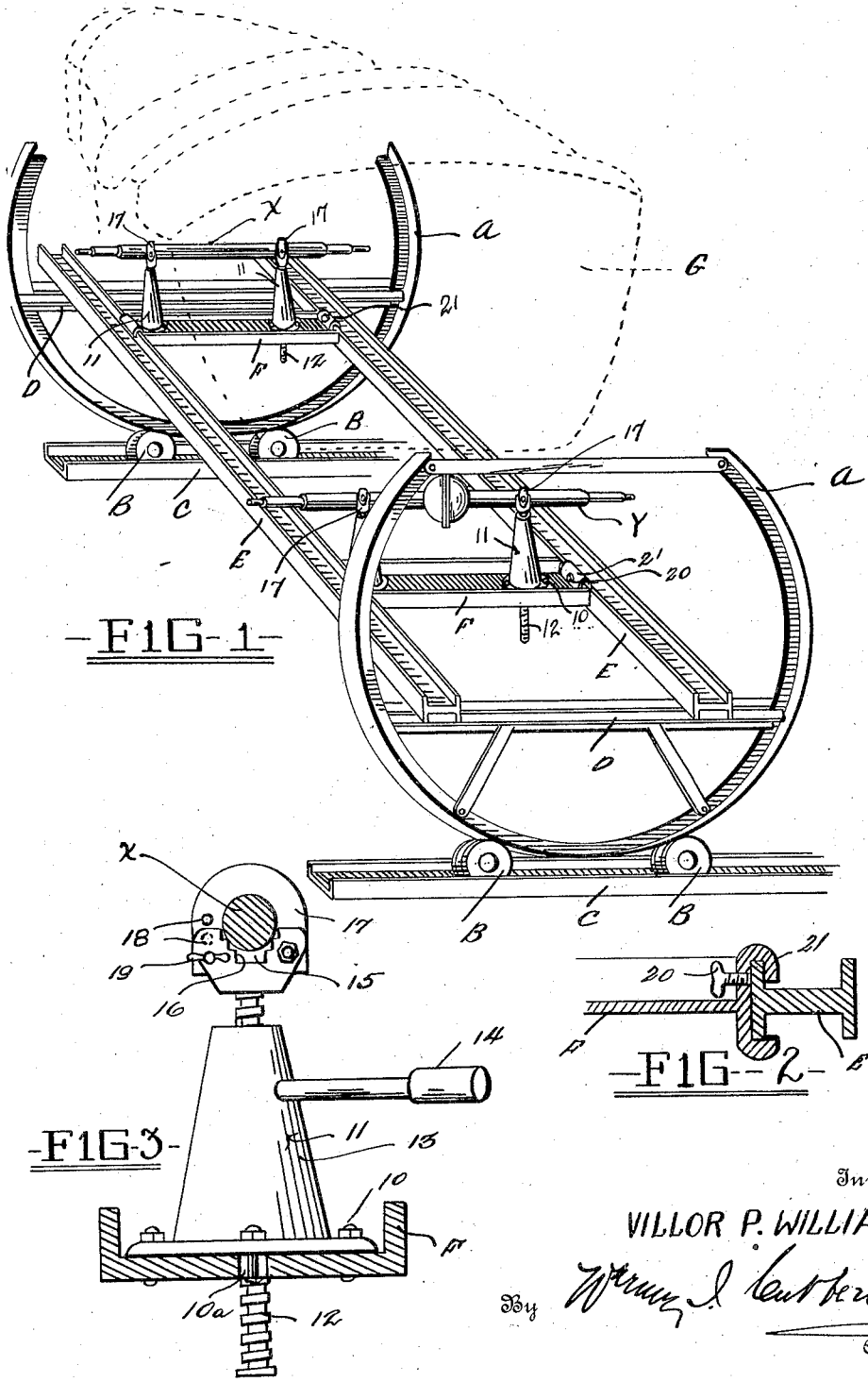
Inventor
VILLOR P. WILLIAMS, Patented Feb. 1, 1927.

1,615,860

UNITED STATES PATENT OFFICE.

VILLOR P. WILLIAMS, OF BALTIMORE, MARYLAND.

ADJUSTABLE VEHICLE SUPPORTING AND TURNING DEVICE.

Application filed December 9, 1925. Serial No. 74,384.

My present invention, in its broad aspect, has to do with improvements in devices for turning automobiles, or other vehicles or objects, bodily on their sides or at any angle which will permit handy access to those parts beneath the same, such for instance as the chassis of an automobile, its transmission or the base of its motor. More particularly my invention relates to means whereby a vehicle or other object is adjustably and positively held in place on one of the aforedefined turning devices, to the end that the vehicle, or other object, may not only be supported at any desired elevation within reasonable limits, but the positive retaining means will engage the vehicle, or other object, at the most advantageous point in its assembly, as for instance, the front and rear axles of a vehicle.

Devices for turning automobiles and other vehicles of the type above defined are known to the trade as "Turn-Auto's" and they are commonly provided with a rotatable frame having a bed to which the vehicle is attached by means of chains or the like. A common type of this device is also provided with cross stringers, and I propose to arrange on said stringers a plurality of improved jacks (of the long-screw type) which engage the axles of a vehicle to both adjustably and positively support the same.

To the foregoing advantages and functions may be added; first, the provision of improved positive gripping means on the jacks for engaging the axles of a vehicle; second, the simplification of such gripping means to the end that repairs and replacements are facilitated; third, the utilization of conventional parts of a vehicle turning device for supporting the adjusting and positive locking devices, namely my improved jacks, and, fourth, the provision of suitable means for rigidifying the bed upon which the vehicle is retained.

The particular elements of my device employed to accomplish the above and other equally important objects will be hereinafter more fully described in detail and pointed out in the claim appended hereunto and forming a part of this specification.

In the accompanying drawings wherein is illustrated the preferred embodiment of my invention:—

Figure 1 is a perspective view of a common type of automobile turning device having my invention incorporated therewith, and here shown as engaging the front and rear axles of the vehicle, the body of which is sketched in dotted lines for purposes of illustration.

Figure 2 is a sectional detail view of my improved means for holding the cross stringers in place, and, Figure 3 is a side elevation of one of my improved jacks.

In the drawing wherein like characters of reference are used to designate like or similar parts throughout the several views:—

(A) designates the front and rear rockers of a conventional form of automobile turning device. Said rockers are supported on rollers (B) riding on track I beams (C). Supported on beams (D) are longitudinal stringers (E) across which are arranged transverse stringers (F). In operation a vehicle, shown in dotted lines at (G) is placed on the bed formed by stringers (E) and (F) and chained fast whereupon the rockers are rotated by a power element (not shown) to dispose the vehicle in the desired angular position to facilitate ready access to its parts.

My improved device consists in bolting, as at (10), a plurality of long-screw jacks (11), preferably two in number, to each of the transverse stringers (F); one adjacent each end of each of the stringers. The stringers (F) are supplied with openings (not shown) through which the screws (12) of the jacks operate when in the position shown in Figure 3. Each jack is formed with a body (13), and a turn bar (14) is provided for actuating the usual worm (not shown) for moving the screw up and down. The heads of my jacks are each formed with a V slot (15), the faces of which are serrated or toothed as at (16) to provide fixed gripping jaws, and pivotally connected to one side of each head is a U-shaped shackle (17) the opposite end of which is provided with a plurality of openings (18) for receiving a winged pin (19) to retain an object, such as a vehicle axle, between the jaws of the head. Since it is possible that by placing the jacks in a certain fixed position the jaws may engage a portion of a vehicle axle not best adapted for supporting the vehicle, I provide, upon occasion, elongated openings (10ª) in stringers (F) for receiving bolts (10) thereby to permit adjustment of the jacks transversely of the supporting bed.

As shown in Figure 1, the front and rear axles (X) and (Y) of an automobile or other vehicle are engaged in the jaws of the pairs of jacks (11) thereby positively holding the vehicle upon its bed irrespective of its angular inclination, and at the same time I render the elevaton of said vehicle adjustable through manipulation of the screws so that the mechanism of the vehicle is made much more readily accessible. However, since it is also one of the principal purposes of my invention to render more positive and rigid the retention of the vehicle on its bed, I provide for each of the ends of the stringers (F) a thumb screw (20) which passes through the ends of the same to hold the lips (21) positively in engagement with the flanges of the stringers (E).

The operation and advantages of my invention are believed to be apparent from the foregoing, but it is specially desired to emphasize its simplicity, durability and efficiency, which lends to its commercialization at a reasonable cost.

While in the foregoing, there has been illustrated in the drawings and described in the specification such combination and arrangement of elements as constitute the preferred embodiments of my invention, it is nevertheless desired to emphasize the fact that interpretation of the invention should only be conclusive when made in the light of the subjoined claim.

I claim:—

The combination with a rotatable support for vehicles, a plurality of jacks arranged upon said support and adapted to be manipulated independently, and heads formed on the adjustable elements of the jacks and each having a toothed slot therein, and a pivoted shackle for each slot for holding an object therein.

In testimony whereof, I affix my signature hereunto.

VILLOR P. WILLIAMS.